United States Patent [19]

Taddeo et al.

[11] 4,067,057

[45] Jan. 3, 1978

[54] DC TO AC SWITCHING CONVERTER

[75] Inventors: Fausto V. Taddeo, San Gabriel; Raymond W. Pauly, Newport Beach, both of Calif.

[73] Assignee: Pacific Electronic Enterprises Inc., Rosemead, Calif.

[21] Appl. No.: 699,865

[22] Filed: June 25, 1976

[51] Int. Cl.[2] .............................................. H02M 1/12

[52] U.S. Cl. ......................................... 363/41; 363/97

[58] Field of Search ........................... 321/9 A, 43, 44; 363/41, 97

[56] References Cited

U.S. PATENT DOCUMENTS

| | | | |
|---|---|---|---|
| 3,017,558 | 1/1962 | Kozacka | 321/14 |
| 3,278,827 | 10/1966 | Corey et al. | 321/44 |
| 3,321,697 | 5/1967 | Etter | 321/9 A |
| 3,406,328 | 10/1968 | Studtmann | 321/9 A |
| 3,521,150 | 7/1970 | Bates | 323/25 X |
| 3,559,028 | 1/1971 | Studtmann | 321/9 A |
| 3,649,902 | 3/1972 | Dunbar | 321/9 A |
| 3,715,649 | 2/1973 | Ravas | 321/9 A |

OTHER PUBLICATIONS

Principles of Inverter Circuits, B. D. Bedford & R. G. Host, John Wiley & Sons, Inc., New York, Dec. 1964, pp. 166–168, 300–301, 310–313.

Electronic Design 25, Dec. 6, 1974, pp. 54–59.

*Primary Examiner*—William M. Shoop

*Attorney, Agent, or Firm*—Lindenberg, Freilich, Wasserman, Rosen & Fernandez

[57] ABSTRACT

A regulated DC to AC power converter of the switching type for providing AC power at a selected output frequency, e.g., 50 Hz, is disclosed. The converter, which eliminates the need for an inverter transformer, is switched at a switching frequency which is considerably higher than the output frequency, e.g., 10 KHz. Due to the high switching rate the converter filter can be designed with small and lightweight components to provide a desired pass band, which includes the output frequency and harmonics thereof, and provides sufficient attenuation for the switching frequency and its higher harmonics, so as to produce an output with very low ripple or waveform distortion. Due to the high switching frequency the output waveform can be regulated with a response time of a fraction of a cycle. The converter includes a modulator section with a unique arrangement to control the switching of the switches between their On and Off states. In preferred embodiments of the converter the switches are implemented with transistors to form AC power at high power levels. Each switch includes a plurality of relatively inexpensive transistors which are connected in parallel with each transistor drawing only a small portion of the total current through the switch. A novel arrangement is employed to increase switch reliability by preventing its failure even though one or more of its transistors may fail in a short-circuit state. For switches implemented with transistors the extended turn-off time of the transistors, due to their saturated states, is accommodated by controlling the turning On of each switch to occur only after the transistors of the previously turned On switch returned to their Off state.

15 Claims, 17 Drawing Figures

Fig. 2a
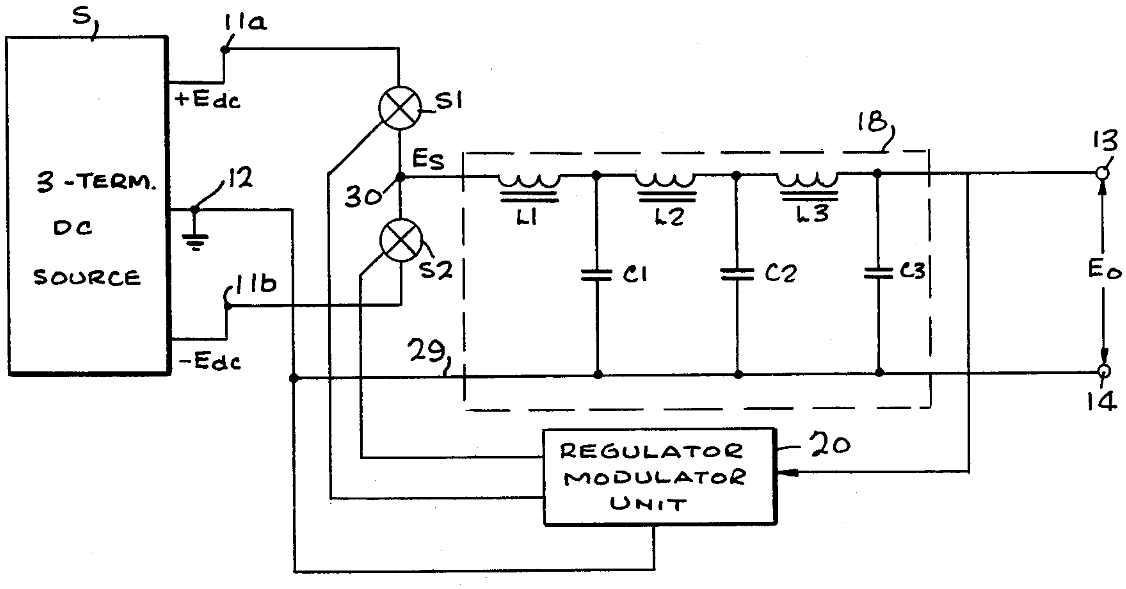
Fig. 2b
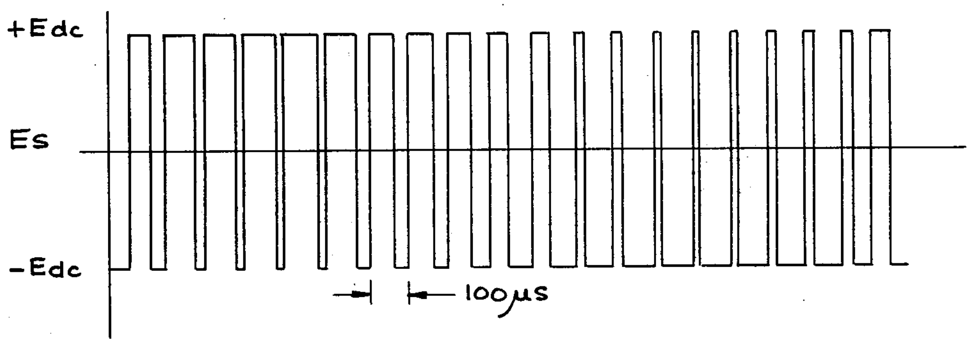
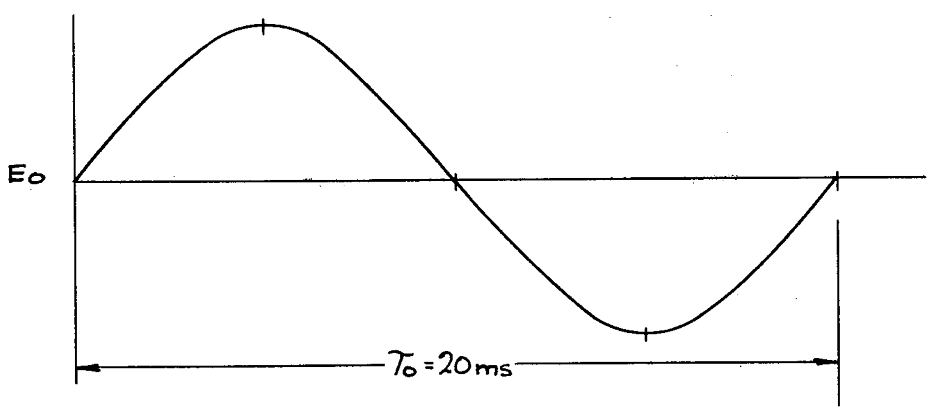
Fig. 2c

Fig. 3
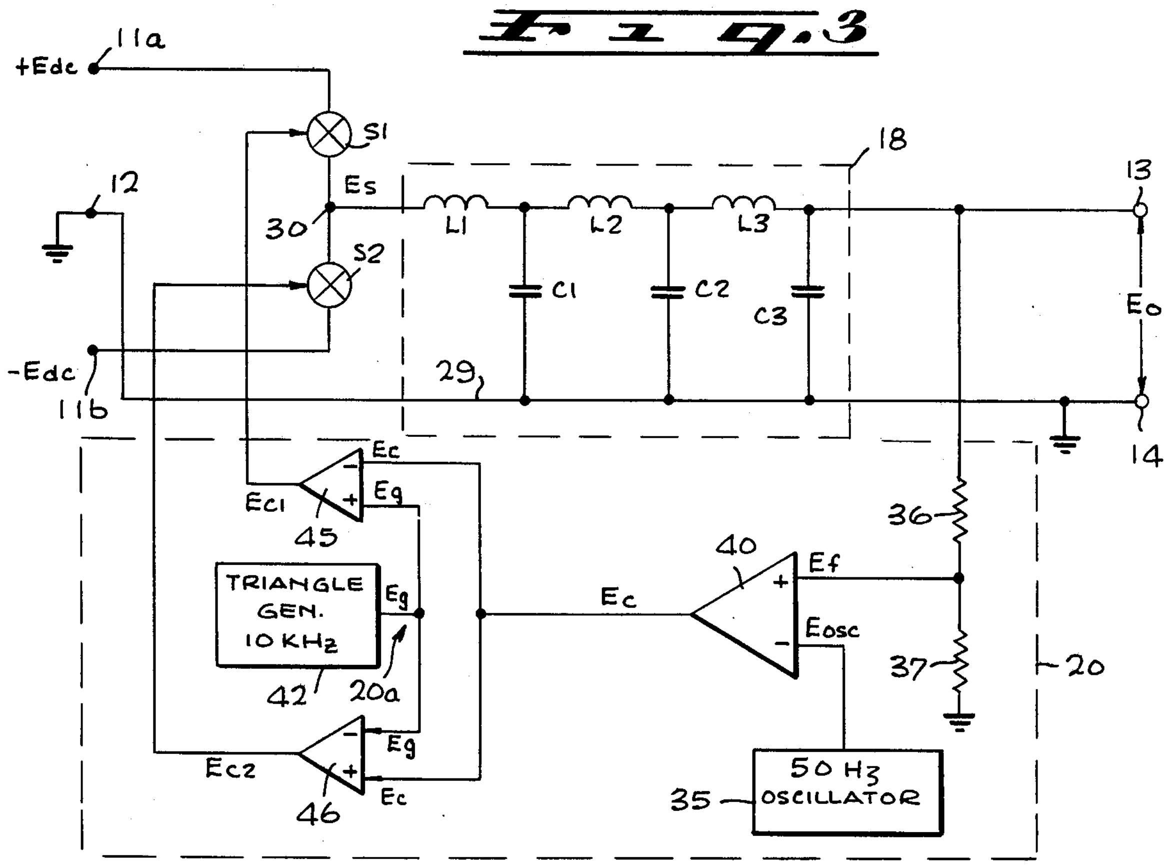
Fig. 3a
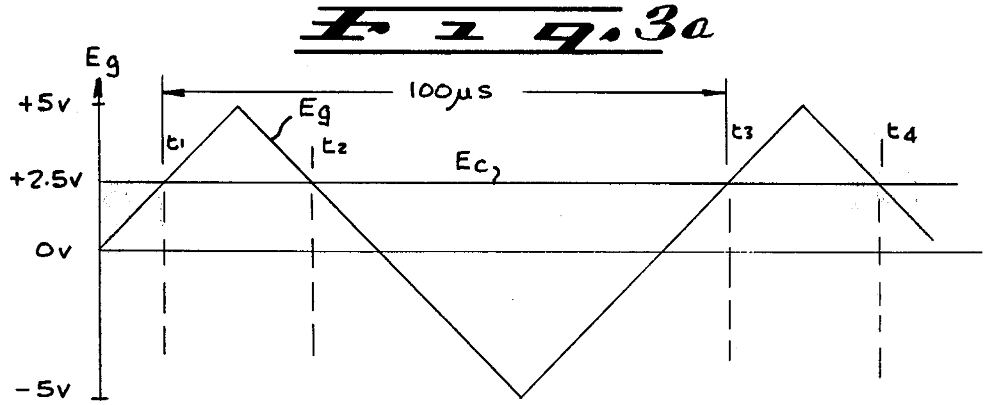
Fig. 3b
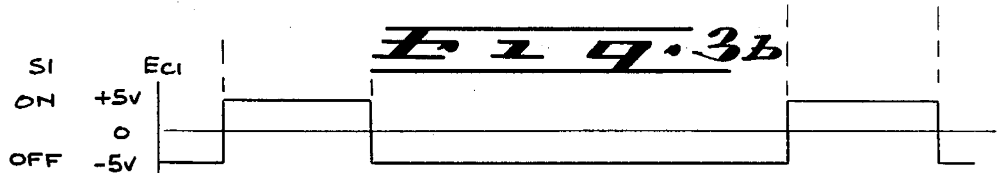
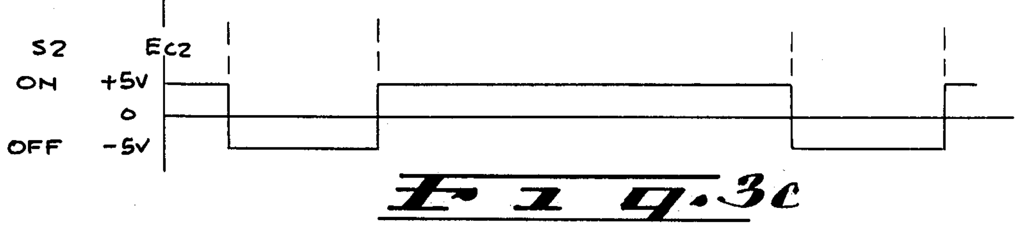
Fig. 3c

DC TO AC SWITCHING CONVERTER

BACKGROUND OF THE INVENTION

1. Field of the Invention

The present invention generally relates to power conversion and, more particularly, to a DC to AC power conversion system of the switching type.

2. Description of the Prior Art

Various types of systems for converting direct-current (DC) power to alternating current (AC) power, hereinafter referred to as DC to AC power converters, are well known. These include converters in which the power conversion is performed by rotating machines, such as motor-generator sets, linear devices such as oscillators followed by power amplifiers, and switching type DC to AC converters. The converters, using linear or switching devices, are preferred by some users over converters with rotating machines, since the former are generally quieter, cleaner and offer superior electrical performance, especially at lower power levels. The major disadvantage of a converter using linear devices, typically an oscillator followed by a power amplifier, is its low conversion efficiency, which in practice is 50% or less. Thus, converters with linear devices are limited to applications in which only modest power levels are required, e.g., up to several KVA.

DC to AC converters of the switching type, which have been developed in recent years, are preferred, particularly at higher power levels because they exhibit higher conversion efficiency. Basically a converter of the switching type converts DC to AC by switching the input DC of alternating polarities into an input transformer, to form a square wave signal or signal of other rectangular waveform. This signal is then passed through a filter network which removes unwanted harmonics from the AC output. High efficiency is realized since the switches which are used dissipate an insignificant amount of power.

In most presently known DC to AC switching converters the switches are believed to be switched at a frequency which is equal to the desired frequency of the AC output. The typical AC output frequency ranges between about 50 Hz to 400 Hz, e.g., 50, 60, 400 or slightly beyond. For example, in a prior art switching converter, operated to produce AC output at 50 Hz, typically the switches are switched at a 50 Hz rate. That is, the switches go through their complete On-Off cycle in 20 ms and the output voltage is driven to its peak value every 10 ms. Due to the low switching frequency, which is typically the same as that of the desired AC output power frequency, the filter has to filter out harmonics of the AC output frequency which is quite low. Consequently, the filter components, such as the inductors and capacitors are large and heavy.

Also, in a prior art switching converter if a regulator is included, which is generally the case, the regulator response time (speed) is limited by the low switching frequency. The regulator response time is commonly on the order of hundreds of milliseconds. Consequently, the regulation of the output waveform does not take place within one cycle but rather over a large number of cycles. Due to these factors presently known switching converters are typically quite large and heavy and produce AC output power of only moderate quality.

OBJECTS AND SUMMARY OF THE INVENTION

It is a primary object of the present invention to provide a new DC to AC switching converter.

Another object of the invention is to provide a DC to AC switching converter in which the switching frequency is other than the AC output power frequency.

Yet another object of the invention is to provide a transformerless DC to AC switching converter.

A further object of the present invention is to provide a DC to AC switching converter with significantly increased regulator response speed in order to provide high quality AC output power.

Yet a further object of the present invention is to provide a DC to AC switching converter adapted to provide AC power output of high quality at any of the desired typical frequencies with the converter including a filter with small and lightweight, relatively inexpensive components.

Still a further object of the present invention is to provide a DC to AC switching converter with unique and highly reliable transistor-incorporating switches.

These and other objects of the invention are achieved by providing a DC to AC switching converter characterized in one aspect by the absence of an input inverter transformer, and in which the switching frequency or rate is significantly higher than the desired frequency of the AC output power. Due to the high switching rate the filter components, used to filter the switching frequency and any of its harmonics are small and lightweight, and the filter size and weight are small. Consequently, the overall size and weight of the novel converter which is characterized by the absence of an input transformer and which incorporates a small lightweight filter are much smaller than those of any known prior art converter, designed to provide the same power level at the same frequency. Also, in the switching converter of the present invention due to the high switching rate, the regulator response speed is very high (very short response time) so that the output waveform can be regulated within a fraction of a cycle rather than over many cycles. Therefore, the AC output power is of high quality. Also, embodiments of the converter of the present invention incorporate novel switches, each implemented with a plurality of relatively inexpensive transistors. Each switch includes means whereby the switch reliability is enhanced even though one or more of the transistors may fail.

The novel features of the invention are set forth with particularity in the appended claims. The invention will best be understood from the following description when read in conjunction with the accompanying drawings.

BRIEF DESCRIPTION OF THE DRAWINGS

FIGS. 2*a,* 2*b* and 2*c* are diagrams useful in explaining a general embodiment of the present invention;

FIG. 3 is a more detailed diagram of the converter shown in FIG. 2*a;*

FIGS. 3*a,* 3*b* and 3*c* are waveform diagrams useful in explaining the operation of the converter shown in FIG. 3;

DESCRIPTION OF THE PREFERRED EMBODIMENTS

Figure 1A:
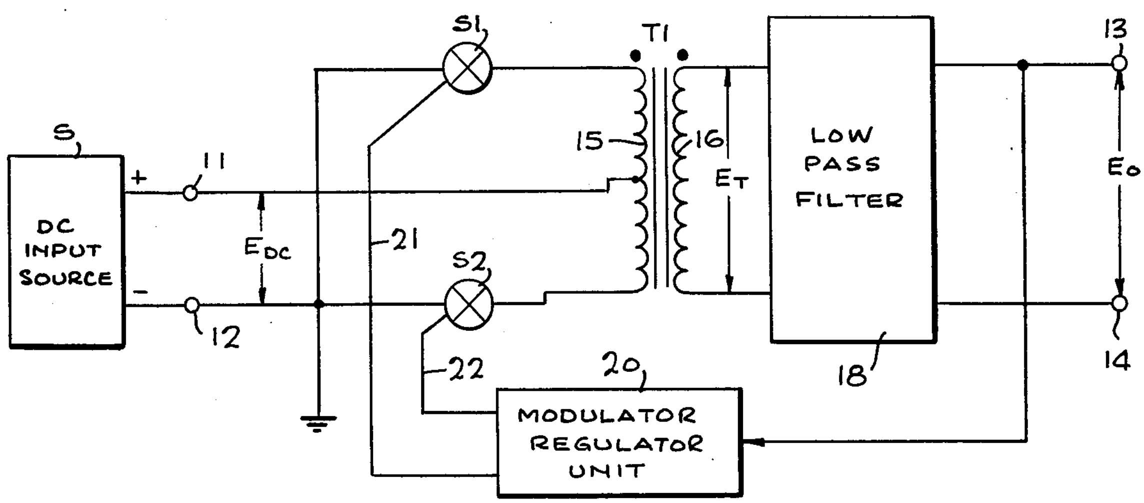
FIGS. 1*a,* 1*b* and 1*c* are diagrams useful in explaining the operation and disadvantages of a typical prior art DC to AC switching converter in which the switching rate is the same as the output power frequency.
Figure 1B:
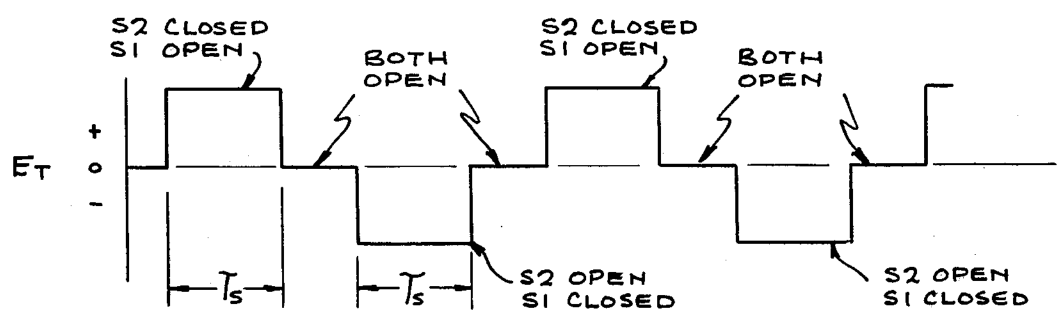
Figure 1C:
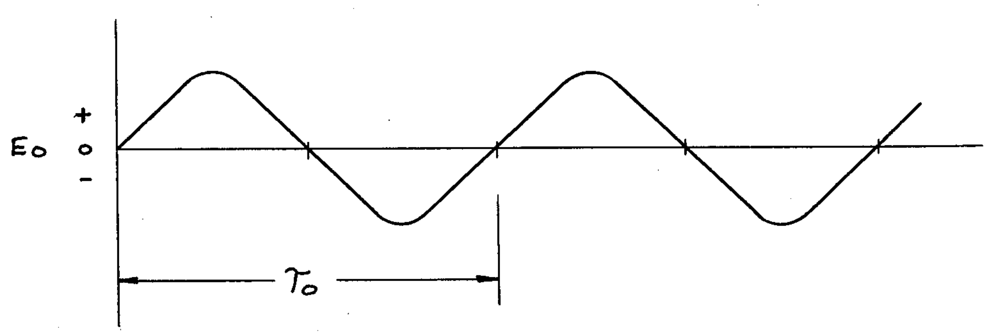

The novelty of the present invention may best be highlighted by first briefly describing a typical prior art DC to AC switching converter in connection with FIGS. 1*a*, 1*b* and 1*c*, and thereafter describing preferred embodiments of the switching converter of the present invention. For explanatory purposes only, it will be assumed that the desired frequency of the AC output power is 50 Hz.

In FIG. 1*a* numerals 11 and 12 designate the input terminals of a prior art converter, to which the positive or plus (+) and negative or minus (−) terminals of a DC input source are assumed to be connected. The desired AC output voltage, designated $E_o$, is provided across output terminals 13 and 14. Input terminal 11 is shown connected to the center tap of a primary winding 15 of a transformer T1, while input terminal 12, assumed for explanatory purposes to be at ground potential, is connected to the opposite ends of the primary winding 15 through switches S1 and S2. The voltage, designated $E_T$, across the transformer secondary winding 16 is applied to a low pass filter 18 whose output is $E_o$ across output terminals 13 and 14. The output voltage $E_o$ is applied to a regulator-modulator 20, which controls the states of switches S1 and S2, via its output lines 21 and 22.

FIGS. 1*b* and 1*c* are waveform diagrams of $E_T$ and $E_o$, respectively. For a 50 Hz output $\tau_0 = 20$ ms. As hereinbefore indicated, in the prior art the switching frequency is typically equal to the desired AC output power frequency. For a 50 Hz output the switches S1 and S2 are driven so that they go through only one complete On-Off cycle in 20 ms. For the polarities of the transformer windings 15 and 16 as indicated in FIG. 1*a* when S2 is closed (or On) and S1 is open (or Off), $E_T$ is positive, as indicated in FIG. 1*b*. However, $E_T$ is negative with respect to ground when S1 is closed (On) and S2 is open (Off).

Typically, the magnitude of $E_o$ is scaled down and compared with a reference. Based on the comparison an error signal is generated which is used to control the On and Off times of each of switches S1 and S2 during each 20 ms cycle. At any time only one of the switches can be closed. In some prior art converters both switches may be open during portions of each cycle as shown in FIG. 1*b*. The On time of each switch is designated by $\tau_s$. As shown in FIG. 1*b* the On time for both switches is the same. $\tau_s$ can be lengthened or shortened to increase or decrease the magnitude of $E_o$, and thus keep $E_o$ at the desired level.

The disadvantages of the prior art were discussed hereinbefore. Briefly, the switching of switches S1 and S2 effectively produce a square wave at the switching frequency which is assumed to be 50 Hz, i.e., equal to the desired output power frequency. To insure an output of even modest quality it is important to filter out the harmonics of the switching frequency without attenuating the output at 50 Hz. Thus, the filter 18 has to have a very sharp roll-off above 50 Hz to minimize the first harmonic at 100 Hz. It is for these reasons that the design complexity, size and weight of the filter are greatly increased, which result in a relatively large and heavy converter. The presence of transformmer T1 further increases the size and weight of the converter. Also, in the prior art switching converter, the regulator response speed is limited (long response time) by the low switching frequency. It is commonly on the order of hundreds of milliseconds, and, therefore, any irregularities in the output power waveform can only be corrected over many cycles of the output. This results in only moderate quality output power.

These and other disadvantages of the prior art are practically eliminated by the novel switching converter of the present invention, which will be described first in connection with FIGS. 2*a*, 2*b* and 2*c*, wherein elements like those previously described will be designated by like numerals. The invention will first be described for explanatory purposes only in connection with a converter, assumed to provide 50 Hz output power. As shown in the converter embodiment, diagrammed in FIG. 2, the converter includes three input terminals designated **11*a*, 11*b* and 12. These are assumed to be connected to a three-terminal DC source, where terminal 11*a* is connected to a plus DC voltage $+E_{dc}$ with respect to a reference potential, e.g., ground, shown connected to terminal 12, while terminal 11*b*** is connected to $-E_{dc}$ with respect to ground. The source is designated by S. In FIG. 2*a*, line 29 which is connected to terminal 12 represents the ground line, with output terminal 14 shown connected thereto. Thus, the AC output voltage $E_o$ at output terminal 13 is with respect to ground.

As shown in FIGS. 2*a*, the voltage $+E_{dc}$ at terminal input **11*a* is applied through switch S1 to a junction point 30, while the voltage $-E_{dc}$ at terminal 11*b* is applied to the junction through switches S2. The voltage at junction 30, which is connected as one input to filter 18, is designated $E_s$, which is referenced to ground which is applied to filter 18 by line 29. It should be stressed at this point that whereas in the prior art transformer T1** is required, in the converter configuration as shown in FIG. 2*a* the transformer is eliminated. Thus, the converter can be viewed as a transformerless converter.

At any time only S1 or S2 is closed, while the other is open. Thus, $E_s = +E_{dc}$ when switch S1 is closed (On) and S2 is open (Off), and $E_s = -E_{dc}$ when S1 is open and S2 is closed. Over any period of time $E_o$ is the average of the voltage applied at junction 30. The states of switches S1 and S2 are controlled by the outputs of regulator-modulator unit 20. For explanatory purposes it is assumed that when unit 20 is in a positive state S1 is closed and S2 is open. When unit 20 is in the negative state, S1 is open and S2 is closed.

In accordance with the present invention the switches S1 and S2 are switched at a much higher frequency (rate) than the 50 Hz outut frequency. For explanatory purposes the switching frequency is assumed to be 10 KHz. Since in the present invention the switching frequency is 10 KHz and the output frequency is only 50 Hz, the design complexity of filter 18 is greatly reduced and small lightweight components can be used therein. Thus, the total cost, size and weight of the converter are greatly reduced. In FIG. 2*a*, the filter is shown consisting of three inductors or coils L1, L2 and L3 and three capacitors C1, C2 and C2. The filter is designed to reject all frequencies including the 10 KHz and above, yet permit the much lower output frequency of 50 Hz and several of its harmonics to pass unattenuated. Filter 18 may be implemented quite easily as a low pass filter with a pass band of 2 KHz to insure the passage of frequencies of 50–400 Hz and some of its harmonics unattenuated, with a roll-off or attenuation on the order of at least 60 dB at the switching frequency of 10 KHz.

Another very significant advantage is realized due to the high (10 KHz) switching rate. Due to this switching rate the regulator response time is greatly shorted, so that the output waveform may be properly regulated within even a fraction of one cycle of the 50 Hz output frequency. Even if the response time of the regulator is dependent on several cycles of the switching frequency of 10 KHz its response time is on the order of a few hundred microseconds which is much less than one-half cycle of the 50 Hz output frequency. Thus, with the present invention output waveform may be corrected, i.e., regulated within a fraction of each output cycle, thereby resulting in a much higher quality of output power, then hereinbefore attained.

FIG. **2*b* is a waveform of $E_s$. $E_s = +E_{dc}$ when switch Sl is closed and S2 is open; while $E_s = -E_{dc}$ when switch S2 is closed and S1 is open. Thus, $E_s$ varies between $+E_{dc}$ and $-E_{dc}$. The two switches S1 and S2 go through a complete switching cycle in 100μs. FIG. 2*c* is a waveform of one cycle of $E_o$ of $\tau_0 = 20$ ms at 50 Hz. It is clear that during each cycle of $E_o$ the switches go through 200 cycles. However, to simplify the drawings fewer switching cycles are shown in FIG. 2*b***.

Attention is now directed to FIG. 3 in connection with which a simplified embodiment of the regulator-modulator unit 20 will be described. As shown the regulator-modulator units 20 includes an oscillator 35. Its output is designated $E_{osc}$. It should be pointed out that the waveform and frequency of oscillator 35 define the waveform and frequency of the output power across output terminals 13 and 14. For 50 Hz sinusoidal output power, oscillator 35 provides a sinusoidal output at 50 Hz. The converter's output voltage, $E_o$ is compared with $E_{osc}$. Resistors 36 and 37 form a simple voltage divider to lower $E_o$ to a lower working level. For example, with $E_{osc} = 5$v RMS, and for $E_o = 120$v RMS resistors 36 and 37 are chosen to provide an output voltage sample $E_f = 5$v RMS. A comparator 40 compares $E_f$ and $E_{osc}$ and provides an output voltage $E_c$, which is an error voltage proportional to the difference between $E_f$ and $E_{osc}$. For the input polarities indicated $E_c$ is positive when the instantaneous value of $E_f > E_{osc}$ is negative when the instataneous value of $E_f < E_{osc}$, and is zero when $E_f = E_{osc}$.

Briefly, the error voltage $E_c$ is applied to the modulator section **20*a* of a regulator-modulator unit 20. The modulator section 20*a* can be viewed as a 10 KHz rectangular wave generator whose dwell time in the positive and negative states during each cycle of 100μs is related to the magnitude and polarity $E_c$. In the positive state of the modulation section 20*a*** its output voltages $E_{c1}$ and $E_{c2}$ are +5v and −5v respectively, and are of opposite polarities when the modulation section is in the negative state. When $E_c =$ Ov the modulator dwells for 50% of each cycle of 100μs in each of its two states.

As shown in FIG. 3 in one preferred embodiment the modulator section **20*a* includes a triangle generator 42 which generates voltage $E_g$ at 10 KHz of triangular waveform, as diagrammed in FIG. 3*a*. $E_g$ is assumed to be 10v peak-to-peak. Since its cycle period is 100μs the slope of its waveform is 2/10 volt per 1μs. The modulator section 20*a* also includes two comparator amplifiers 45 and 46**, whose outputs are the control voltages which are $E_{c1}$ and $E_{c2}$, respectively. Each of these comparators compares $E_g$ with $E_c$. For the indicated polarities $E_{c1}$ is plus, assumed +5v, when $E_g \geq E_c$ and is minus, assumed −5v, when $E_g < E_c$. On the other hand $E_{c2}$ is plus (+5v) when $E_g < E_c$, and is minus (−5v) when $E_g \geqq E_c$. Thus, at any time one of the output control voltages $E_{c1}$ or $E_{c2}$ is +5v while the other is −5v. The output voltages $E_{c1}$ and $E_{c2}$ respectively control the states of switches S1 and S2. Each switch is assumed to be turned On or closed by a control voltage of +5v and turned Off or open by a control voltage of −5v.

Attention is now directed to FIGS. **3*a*, 3*b* and 3*c* which are waveform diagrams useful in explaining the modulator section 20*a* just described. In FIG. 3*a*, $E_g$ is diagrammed as well as $E_c$ for a case where the instantaneous value of $E_c = +2.5$v. FIGS. 3*b* and 3*c*** are waveforms of the control voltages $E_{c1}$ and $E_{c2}$, respectively, as well as the On-Off states of switches S1 and S2 which they control. When $E_c$ is positive, e.g., +2.5v it indicates that the output voltage $E_o$ is more positive than desired. Thus, it is obvious that it is desired to reduce the On time of S1 and increase the On time of S2. For the diagrammed waveforms prior to time $t_1$, $E_g = E_c$. Thus, $E_{c2} = +5$v and $E_{c1} = -5$v. Therefore, S1 is Off and S2 is On. Between times $t_1$ and $t_2$ which is only 25μs long, or 25% of the full 100μs cycle, $E_g > E_c$. Thus, $E_{c1} = +5$v and therefore S1 is On, while $E_{c2} = -5$v and therefore S2 is Off. Then, for the following 75μs (or 75% of cycle time) $E_g < E_c$. Therefore, $E_{c2} = +5$v and S2 is turned On, while $E_{c1} = -5$v and S1 is Off.

Thus, when $E_c$ is positive S1 is On for less than 50% of each cycle. On the other hand when $E_c$ is negative S2 is On for less than 50% of each cycle. However, when $E_c = 0$, each switch is On for 50% of each cycle. It is thus seen that the percentage of time during which each of switches S1 and S2 is On in each cycle depends on the instantaneous value of the error voltage $E_c$. $E_s$ at junction 30 is thus a voltage of 10 KHz rectangular waveform which switches between $+E_{dc}$ (when S1 is On) and $-E_{dc}$ (when S2 is On). It is connected to the filter 18 whose output is the output voltage $E_0$ which equals the average value of $E_s$.

It should be stressed that for proper operation both switches S1 and S2 should not be On at the same time. Thus, it is important that each of them be turned On only after the other was turned Off. Each of switches S1 and S2 can be implemented with any proper switching device, e.g., a vacuum tube, transistors or SCRs. Vacuum tubes have excessive voltage drops in their closed position, and therefore are not particularly desirable. SCRs may be used. However, at the present state of the art SCRs are not readily available for high switching rates such as 10 KHz. At present SCRs are limited to switching rates of not more than a few KHz, e.g., 1 to 5 KHz. The cost of SCRs increases with increased switching rate capability.

For higher switching rates transistors are particularly advantageous. However, most transistors capable of high switching rate operation have limited power rating. Also, the cost of a transistor increases with increased power rating. In order to form AC power at high power levels, e.g., one or more KVAs, each switch must be able to conduct a high current. It is recognized that the conduction of the high current may be shared by connecting several relatively expensive high power rated transistors in parallel. However, when connecting such transistors in parallel the failure of any one transistor in a shorted state may result in the failure of the entire switch. The prior art has not solved the problems of producing a relatively inexpensive and highly reliable switch with a high power rating. It is for this reason that in the known prior art of DC to AC switching converters, capable of forming AC power at high power levels, the switches are implemented with devices other than transistors.

In addition to the above mentioned problems, which faced the prior art in attempting to implement the switches with transistors, transistors present an additional problem to a switch designer. As is known, the turn-on and turn-off rates of a transistor differ from one another. A transistor turn-on time is a characteristic of the transistor chosen. Presently, transistors are available with a turn-on time of 1$\mu$s or less. However, the turn-off time of a transistor is generally longer than its turn-on time and is related to its saturated or charged state; the more saturated the transistor the longer its turn-off time. Transistor turn-off time can be reduced by pulling overdrive base current in the turn-off direction. However, it has been found that such base current creates undesirable stresses in the transistor base-emitter junction and therefore shortens the transistor's life.

These problems are solved by the present invention by providing transistorized switches with novel configurations. As will be explained hereinafter in detail each switch, which has a sufficiently high power rating so as to produce the desired high power output, is implemented with a plurality of parallel-connected inexpensive transistors. Means are included in each switch which protect the switch from failing, even though one or more of its transistors may fail in the shorted state, thereby greatly increasing the switch reliability.

It has been found that for best switch reliability it is desirable to provide equal turn-on and turn-off drive signals, yet accommodate the uneven transistor reaction times by other than over-drive base current in the turn-off direction. In a preferred embodiment of the present invention, in which the switches S1 and S2 are implemented with transistors, the modulation section **20*a* applies a turn-off signal to the switch which is On and delays the application of the turn-on signal to the other switch by a selected period. This period is sufficient to enable the transistors of the previously turned On switch to return to a completely turned-off state, thereby returning the switch to its Off state. In this manner the switch which was previously On (closed) is switched to its Off (open) state, before the other switch is switched to its On (closed) state. Thus, the two switches S1 and S2 are prevented from being On at the same time, even though their turn-off time is longer than turn-on time. For explanatory purposes let it be assumed that the transistors in switches S1 and S2** return to a completely Off state within not more than 10$\mu$s after the application of a turn-off signal. Thus, it is desired to delay the turn-on signal to one switch by 10$\mu$s after the application of a turn-off signal to the previously On switch to enable the transistors, forming the latter, to fully discharge and return to their Off state.

Figure 4:
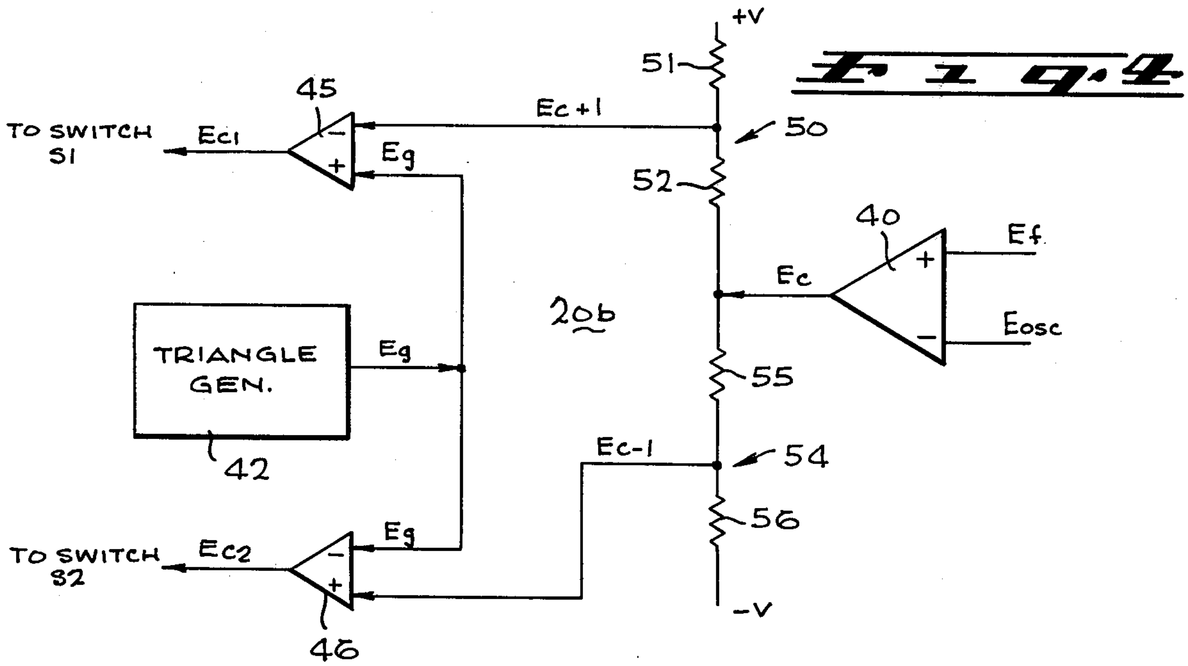
FIG. 4 is a partial diagram of a different embodiment of a regulator-modulator unit.
Figure 4A:
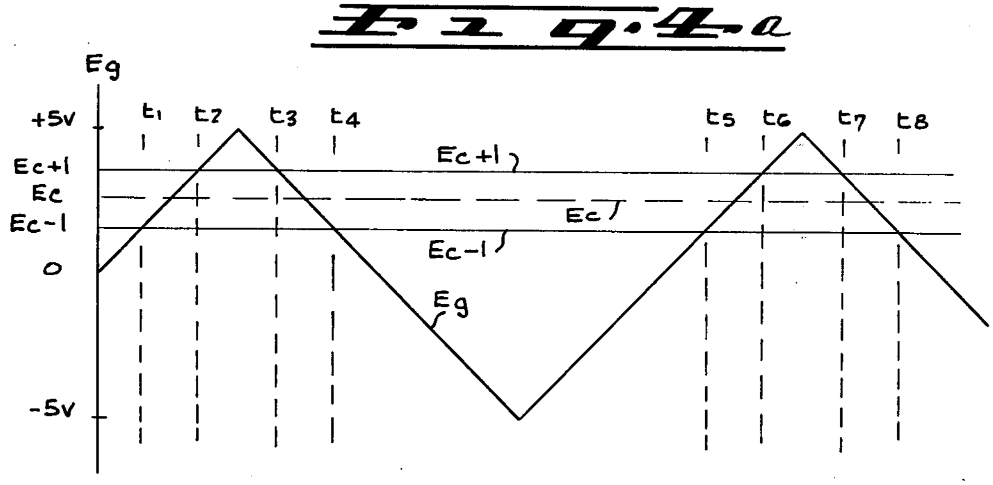
FIGS. 4*a*, 4*b* and 4*c* are waveform diagrams useful in explaining the advantages realized with the regulator-modulator unit shown in FIG. 4.
Figure 4B:
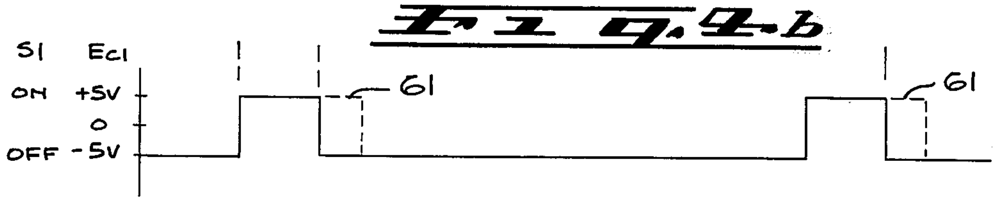
Figure 4C:
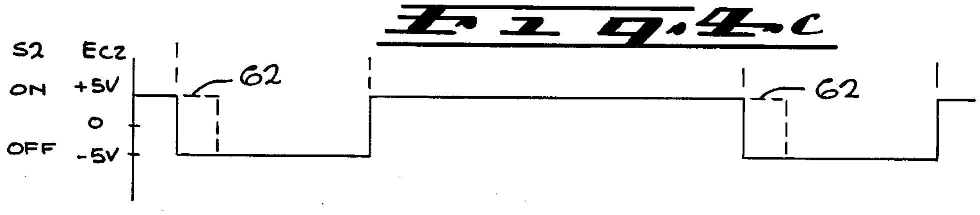

It should be recalled that hereinbefore it was assumed that $E_g$ is at 10 KHz with 10v peak-to-peak. Thus, its slope is 2/10 volt per 1$\mu$s. This can be accomplished quite easily in the embodiment of the modulator section **20*a*, as hereinbefore explained in connection with FIGS. 3, 3*a*, 3*b* and 3*c*, by slightly modifying it to provide a modulator section 20*b*, as shown in FIG. 4. FIGS. 4*a*–4*c* are similar to those of FIGS. 3*a*–3*c*, except that they relate to the modulator section 20*b*, diagrammed in FIG. 4. Briefly, as shown therein instead of comparing the error voltage $E_c$ with $E_g$ in comparators 45 and 46, as described in connection with FIG. 3, one simple voltage divider network 50 is incorporated. Network 50 consists of resistors 51 and 52, which are connected between a reference voltage +V and $E_c$ to offset $E_c$ and produce a voltage $E_c + 1$, hereinafter designated $E_c + 1$, which is supplied to comparator 45 for comparison with $E_g$. Similarly, another divider network 54, consisting of resistors 55 and 56, is provided. It is connected between a reference voltage −V and $E_c$, to provide a voltage $E_c - 1$v, hereinafter designated $E_c - 1$, which is compared with $E_g$ in comparator 46**.

The voltages $E_g$, $E_c$, $E_c + 1$ and $E_c - 1$ are diagrammed in FIG. **4*a*. It should be appreciated that $(E_c + 1) - (E_c - 1) = +2$v. Thus, $E_g$ ramps up between $E_c - 1$ and $E_c + 1$ in 2/(2/10) = 10$\mu$s. From the foregoing description of comparators 45 and 46 it should be apparent that $E_{c1}$ is +5v when $E_g \geqq (E_c + 1)$, thereby providing a turn-on signal to switch S1, and $E_{c1}$ is −5v when $E_g < (E_c + 1)$, thereby providing a turn-off signal to S1. Similarly, $E_{c2}$ is +5v when $E_g < (E_c - 1)$, thereby providing a turn-on signal to S2, and is −5v when $E_g \geqq (E_c - 1)$ thereby providing a turn-off signal to S2**.

As seen from FIGS. **4*a*–4*c* prior to time $t_1$, $E_g < (E_c - 1)$. Therefore, $E_{c1}$ is −5v and $E_{c2}$ is +5v and switches S1 and S2 are open (Off) and closed (On) respectively. With S1 Off and S2 On, the modulation section 20*b* is in the negative state. At $t_1$ as $E_g$ equals and increases above $E_c - 1$, i.e., $E_g \geqq (E_c - 1)$, $E_{c2}$ becomes −5v and therefore S2 is provided with a turn-off signal. However, S1 is not turned On. S1 is provided with the turn-on signal 10$\mu$s later, at time $t_2$, as $E_g$ equals and rises above $E_c + 1$ so that $E_{c1} = +5$v. S1 remains On (closed) until time $t_3$ when it receives a turn-off signal when $E_g < (E_c + 1)$. However, S2 remains Off until time $t_4$ (where $t_4 - t_3 = 10\mu s$) when $E_g < (E_c - 1)$. At $t_4$, C21 = +5v applying a turn-on signal to S2. It remains On until time $t_5$ when $E_g$ again equals and rises above $E_c - 1$, when another turn-off signal is applied to S2**.

The turn-on time of each transistor switch is extremely short, on the order of 1$\mu$s or less. Thus, as a turn-on signal is applied thereto the switch turns On practically instantaneously. It should thus be appreciated that during each 100$\mu$s cycle of the switching rate with $E_c = +2.5$v, $E_{c1}$ is +5v for 15$\mu$s, $E_{c2}$ is +5v for 65$\mu$s and the transition periods between the turn-off signal to one switch and the turn-on signal to the other switch is 20$\mu$s. However, as previously explained a transistor may turn Off several $\mu$s after a turn-off signal is applied thereto, depending on the transistor saturation state. It is believed that 10$\mu$s is ample time for a fully saturated transistor to return to a fully cut-off or Off state. In FIGS. **4*b* and 4*c* the switches S1 and S2 are shown as they turn Off upon the application of the turn-off signals thereto. However, in practice they remain On beyond the times these turn-off signals are applied, as indicated by dashed lines 61 for S1 and 62 for S2**.

From the foregoing description of FIGS. 4, **4*a*, 4*b* and 4*c*, it should be apparent that equal turn-on and turn-off signals are applied to the transistorized switches S1 and S2**. The error signal $E_c$ is offset by selected voltages, e.g., by +1v and −1v (see FIGS. 4 and 4*a*), so that after one switch, e.g., S1 is turned Off, the application of a turn-on signal to other switch S2 is delayed by a selected time interval, e.g., 10μs. This enables the transistors in the switch to which a turn-off signal was applied to discharge and return to the Off state. Thus, the problem, associated with the charged state of the transistors, is eliminated, and each switch is turned On only after the other switch has returned to its Off state.

It should be stressed that the advantages of offsetting the error signal $E_c$, to insure that one switch is turned On only after the other switch returned to its Off state is not limited to switches with transistors only. Practically all solid state switching devices, e.g., SCRs, have a charged-state problem. Some time interval has to elapse before an SCR returns to its Off state after the application of a turn-off signal thereto. This interval depends on the charged state of the device. Thus, the error signal offsetting arrangement, as described in connection with FIGS. 4, 4*a*–4*c*, is useful in any application in which the switches are implemented with solid-state devices, particularly when such devices are switched at high rates.

It is important to note that when $E_c \geqq +6$, $(E_c - 1) \geqq 5$v. Therefore, S2 remains On and S1 remains Off for one or more cycles of the switching frequency from generator 42. In fact S2 remains On as long as $E_c \geqq +6$v. Likewise, as long as $E_c \geqq -6$v, S1 remains On and S2 remains Off. This is desirable for several reasons. It enables the converter to make rapid corrections in the output voltage $E_o$, as may be occasioned by short-term transients in load current. Also, since one switch can remain On for one or more complete switching cycles without the other switch being turned On. The output voltage peak can be made equal to the DC input voltage, ($E_{dc}$), thereby resulting in maximum output voltage which accounts for maximum power output.

Figure 5:
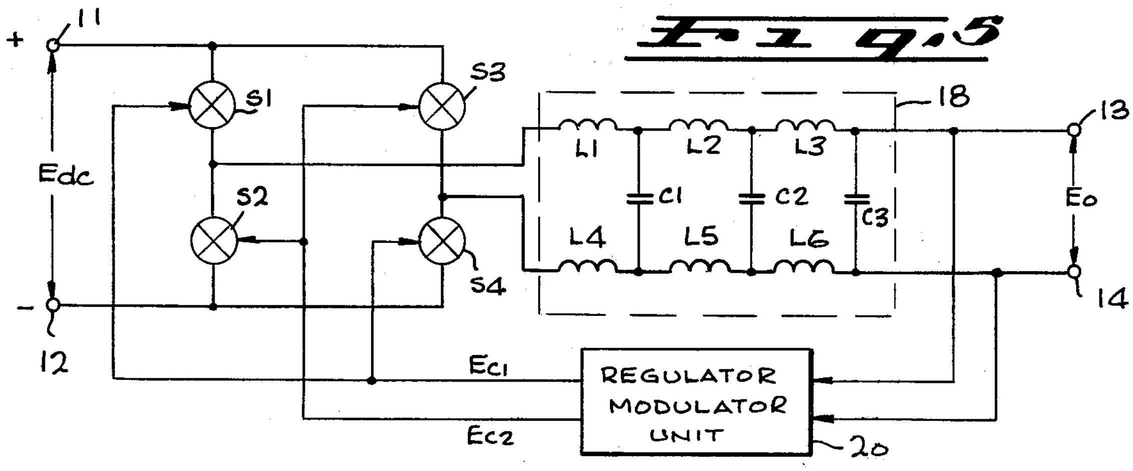
FIGS. 5 and 5*a* are other embodiments of a DC to AC switching converter in accordance with the present invention.

Before describing a specific embodiment of each of switches S1 and S2 attention is directed to FIG. 5. Hereinbefore the invention has been described in connection with a three-terminal input DC source S which provides $+E_{dc}$, $-E_{dc}$ and ground to input terminals 11*a*, 11*b* and 12, respectively (See FIGS. 2*a* and 3). The invention is not intended to be limited thereto. In FIG. 5, the inputs to input terminals 11 and 12 are assumed to be from a two-terminal input DC source, providing the DC input voltage $+E_{dc}$. In this embodiment four switches S1–S4 are required. S1 and S4 are assumed to be driven simultaneously by the same control voltage $E_{cl}$ from regulator-modulator unit 20, while S2 and S2 are driven simultaneously by $E_{C2}$. The filter 18, rather than being a three-terminal filter, as previously described, is shown as a four-terminal filter and includes three additional inductors L4, L5 and L6. It should be pointed out that in the three-terminal input converter the peak-to-peak amplitude of $E_o$ equals $2E_{dc}$.

In the converter embodiment shown in FIG. 5, the AC voltage at each of output terminals 13 and 14 varies between the minus (−) potential of $E_{dc}$ at input terminal 12 and the plus (+) potential at input terminal 11. However, the two AC voltages at output terminals 13 and 14 are 180° out of phase with respect to one another. Thus, the peak-to-peak voltage at one of the output terminals, e.g., terminal 13, with respect to the voltage at terminal 14 is $2E_{dc}$.

Figure 5A:
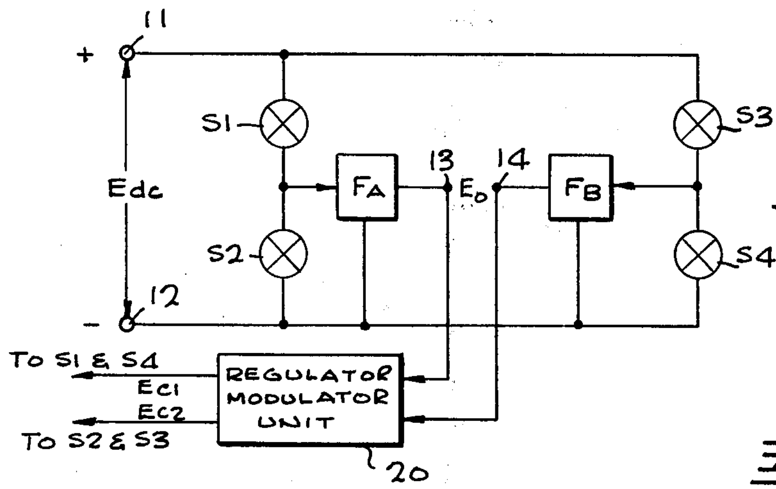

One can view the embodiment shown in FIG. 5 as consisting of two separate switching and filter units, as shown in FIG. 5*a*. Therein, the four-terminal filter 18, as shown in FIG. 5, is represented by two separate three-terminal filters $F_A$ and $F_B$. Filter $F_A$, together with switches S1 and S2, form one switching and filter unit and filter $F_B$ together with switches S3 and S4 form another unit. The output terminals 13 and 14 may be connected to a single regulator-modulator unit 20, such as the one shown in FIG. 5, which is assumed to drive S1 and S4 simultaneously by the same control signal or voltage $E_{c1}$, while S2 and S3 are assumed to be driven simultaneously by $E_{c2}$. In such an embodiment the waveform of the output voltage across terminals 13 and 14 is defined by the waveform of oscillator 35 (see FIG. 3).

If desired, however, the output voltage at output terminal 13 (with respect to the minus potential of $E_{dc}$) may be applied to a separate regulator-modulator unit which would control the switching of S1 and S2 to provide an output voltage at output terminal 13 of a waveform, which depends on the waveform of the oscillator in the regulator-modulator unit. A separate regulator-modulator unit responsive to the voltage at terminal 14 (with respect to the minus potential of $E_{dc}$) may be used to control the waveform and regulate the amplitude of the voltage at terminal 14 by controlling the switching of switches S3 and S4. The resulting waveshape and amplitude of the AC voltage across output terminals 13 and 14 will be a function of the voltage waveshape and amplitude at one of the output terminals with respect to that at the other output terminal.

Figure 6:
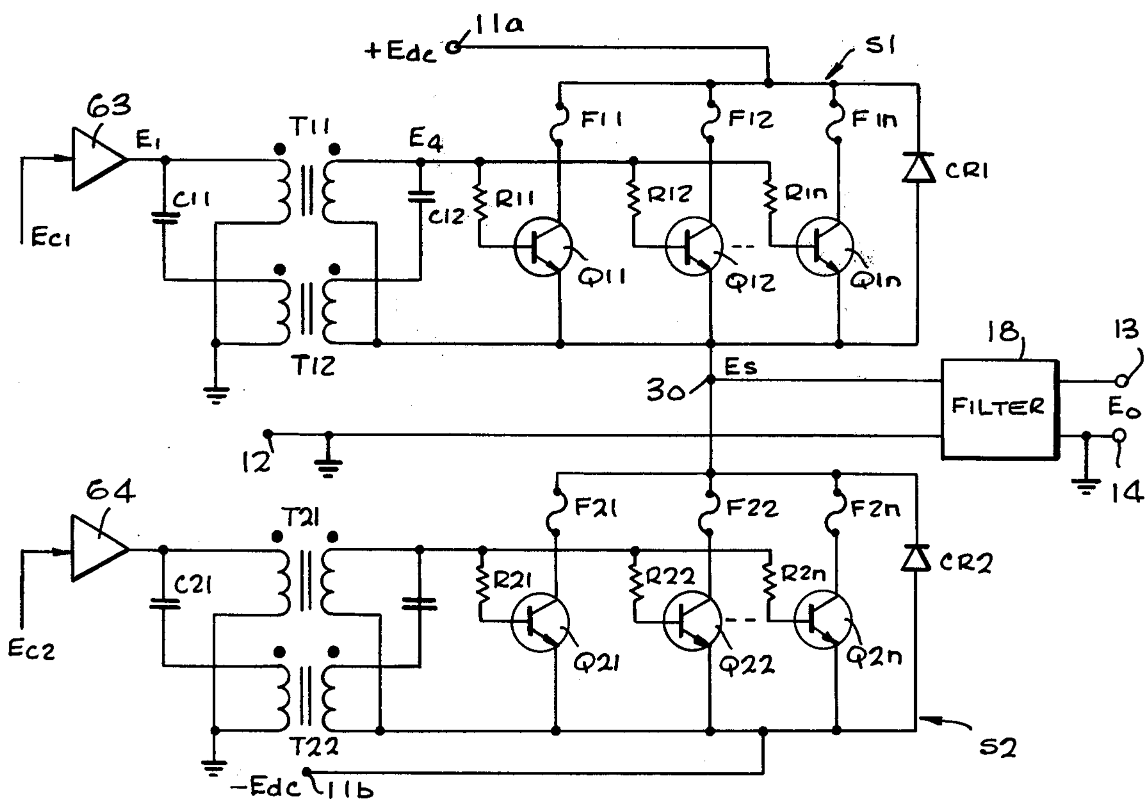
FIG. 6 is a diagram of switches in accordance with one aspect of the invention.

As previously indicated in one converter embodiment for an AC output frequency of 50 Hz and a switching frequency of 10 KHz, which was actually reduced to practice, the filter is a low pass filter with a band of 2 KHz with 60 dB rejection at 10 KHz. The 2 KHz band is desirable since load impedance discontinuities can be anticipated which could distort the sinusoidal waveform of $E_o$. Thus, by providing a pass band of 2 KHz, corrections up to the fortieth harmonic of the 50 Hz output are possible. A practical three section filter requires at least two octaves of frequency separation to go from near zero to 60 dB attenuation. Thus, for a pass band of 2 KHz the switching rate of 10 KHz is chosen, which is more than two octaves above 2 KHz. It should be apparent that those familiar with the art may design either a three-terminal filter or a four-terminal filter to provide the desired pass band for the output frequency and one or more of its harmonics, and an attenuation of the switching frequency, and its higher harmonics Attention is now directed to FIG. 6, wherein one embodiment of switches S1 and S2 implemented with transistors is shown. It will be described in connection with the three-terminal input converter embodiment. In FIG. 6, the control signal $E_{c1}$ for switch S1 is shown applied to an amplifier 63 which provides power gain to $E_{c1}$ in order to supply the high currents to the switch S1. Similarly, control signal $E_{c2}$ for switch S2 is amplified by an amplifier 64. The outputs of amplifiers 63 and 64 are designated by E1 and E2, respectively.

Both voltages E1 and E2 are generated with reference to the converter common, i.e., ground. However, the transistors Q11, Q12, . . . Q1n of S1, which is the positive drive switch, are driven between $+E_{dc}$ at input terminal 11*a* and the voltage at junction 30. Also transistors Q21, Q22, and Q2n of switch S2, which is the negative drive switch, are driven between the voltage at junction 30 and the negative input voltage $-E_{dc}$ at input terminal 11*b*. It is thus seen that the transistor switches are driven with references other than ground. Consequently, E1 and E2 have to be applied to the transistors of the two switches through coupling transformers.

The design of the transformer required for each switch is complicated by the fact that the transformer must have sufficient low frequency response to pass the lowest frequency components of $E_{osc}$, provided by oscillator 35 (see FIG. 1), hereinbefore assumed to be 50 Hz. Yet, the transformer must have sufficient high frequency response to drive the transistors' bases at high switch rates, e.g., 10 KHz. For efficient operation at a 10 KHz switching rate, the transistors must be driven On and Off at switch times in order of a microsecond. Fast switching time is necessary to minimize the switch losses during the transitions between the On and Off states. These two requirements dictate transformer design parameters which are difficult to meet in a single transformer.

In accordance with one aspect of the present invention the coupling transformer of each switch consists of two transformers, one, to pass low frequency switch energy, and the other to pass high frequency switch energy. In switch S1, transformer T11 passes only low frequency energy, e.g., 50 Hz energy, and transformer T12 passes only high frequency energy, e.g., 10 KHz energy. Capacitor C11 is used to keep the low frequency energy out of the high frequency transformer T12, and C12 is used so that the secondary of the low frequency transformer T11 does not become overloaded by connection to the secondary of T12. Since the frequency range separating the low and high frequencies is great, the required separation of the two transformers is easily achievable with the two capacitors. In FIG. 6 the primary windings of the two transformers are shown for explanatory purposes, as referenced to ground, to which the regulator-modulator unit 20, from which $E_{c1}$ and $E_{c2}$ are received, is assumed to be referenced. The net result of this two transformer configuration is that the switch drive waveform $E_1$ is transformed to the secondary side, designated $E_{b1}$, with excellent low frequency and high frequency response characteristics. Similar functions are performed in switch S2 by transformers T21 and T22 and capacitors C21 and C22.

As seen from FIG. 6 in switch S1 the bases of Q11, . . . Q1n are connected to $E_{b1}$ through base-current limiting resistors R11, . . . R1n, respectively. Similarly, resistors R21, . . . R2n are connected to the bases of Q21, . . . Q2n of switch S2. Also, clamp diodes CR1 and CR2 are respectively connected across the collector-emitter paths of parallel connected Q11, . . . Q1n and Q21, . . . Q2n. If the load current $I_o$ were always in phase with output voltage $E_o$ the two clamp diodes CR1 and CR2 would not be necessary. However, most practical loads, which are to be connected to the converter's output terminals 13 and 14, have power factors which may be other than unity, resulting in some phase angle difference between $E_o$ and $I_o$. This means that there are portions of the output cycle when the output current $I_o$ is negative even though the average value of $E_s$ is positive, and vice versa. In this case, during the time that S1 is On (closed) and $E_s = +E_{dc}$, output current ($I_o$) would flow not through the power ransistors Q11, . . . Q1n but in the opposite direction through CR1. A similar condition occurs during the latter portion of the cycle when the output voltage is negative and output current is positive. In this instance when switch S2 is On (closed), current would actually flow in the opposite direction through CR2. Another way of viewing the functions of CR1 and CR2 is to state that when S1 is On, $E_s = +E_{dc}$, regardless of the direction of current flow through S1. Further, when S2 is On, $E_s = -E_{dc}$, regardless of the direction of current flow through S2.

As is appreciated the current flow through any transistor is limited. In order to enhance the converter's output current capability each of switches S1 and S2 consists of several transistors connected in parallel. The realiability of the transistors, which form each switch, effectively defines the reliability of the converter. Generally, as more transistors are connected in parallel the converter reliability is indirectly related to the number of the transistors of the switch. With a large number of transistors per switch, e.g., tens of transistors, connected in parallel, the converter reliability can become intolerably low. In accordance with one aspect of the present invention a unique solution is provided to this problem. As shown in FIG. 6 a fuse is connected in series with each transistor collector. The fuses of switch S1 are designated by F11, . . . F1n, while those of switch S2 are designated by F21, . . . F2n.

Any transistor which fails, by becoming open circuited, does not present any problem, since the switch is unaffected, except for the slight loss of switch power capacity. On the other hand, any transistor (e.g., Q12) which fails by becoming a short circuit, i.e., fails in a shorted state, will cause the switch (S1) to remain closed even though the switch drive signal is attempting to turn the switch (S1) Off. However, when the alternate switch (S2) is turned On, a large amount of current flows momentarily between $+E_{dc}$ and $-E_{dc}$ through the failed or shorted transistor (Q12) and through the switch (S2) which is turned On. This large current instantly blows the fuse (F12) in series with the shorted transistor (Q12). However, such large current does not result in the destruction of any of the transistors in the switch (S2) which is being driven On, because the short circuit current is evenly distributed among the many transistors (Q21, . . . Q2n) of the turned On switch (S2).

In practice the blowing of a fuse, connected in series with a shorted transistor in one switch, need not be dependent on the current flowing in a turned On other switch. The output section of the converter, i.e., the filter and the output terminals, may include means to cause a large DC current to flow through the shorted transistor, thus causing its associated fuse to blow. For example, in a converter with a transformer output, in which the output terminals 13 and 14 are connected across a transformer primary, with the load to be connected to the transformer secondary, the primary winding may provide a DC current path, so that if a transistor shorts the DC current which would flow through it, while the other transistors are turned Off, will cause the fuse to blow.

In one embodiment switch protection against a shorted transistor is further enhanced by incorporating a current sensor in the current path through each switch. In this embodiment if the sensed current exceeds a selected threshold, thereby indicating excessive current flow through a shorted transistor the switching operation is temporarily inhibited. One way in which this may be achieved is by disabling the modulator for a selected interval so that all switches are driven to the Off state. At the interval end if the sensed current drops below the selected threshold, it indicates that the fuse associated with the shorted transistor blew, and normal opration is resumed. If, however, the sensed current is still above threshold, the switching operation is continued to be inhibited until the fuse of the shorted transistor blows and the sensed current drops below the threshold. Such an arrangement prevents a switch from being turned On while a shorted transistor in the other switch continues to conduct current, i.e., before the protective fuse has blown to permanently disrupt all future current flow through th shorted transistor. Thus, such an arrangement prevents current from flowing through two switches connected in series to the input DC source.

It should be pointed out that by incorporating individual fuses in conjunction with a large number of transistors, the switch reliability is actually increased with an increasing number of transistors, since the failure of any transistor does not affect the operation of the other transistor of the switch. The only effect of a failed transistor is reduced current capacity of the switch. In fact, with the fuses and several transistors, the switch reliability is greater than that of a switch with a single transistor.

From the foregoing description it would be appreciated that in accordance with the present invention a novel DC to AC switching converter is provided. In the converter the switching frequency is significantly higher than the desired output power frequency. Although the invention was described in connection with an output frequency of 50 Hz for $E_o$, and a switching frequency of 10 KHz, it should be appreciated that the converter may be designed to provide any desired output frequency. Also, a switching frequency other than 10 KHz may be employed. By employing a high switching frequency several very significant advantages result therefrom. First, smaller and lighter filter components can be used, thereby reducing the overall converter size and weight. Secondly, the filter can be designed to have sufficiently broad bandwidth to include the output frequency and some of its harmonics. Also, the filter can be designed quite easily and inexpensively to have high attenuation of the switching frequency in order to reduce the output ripple, contained in the output $E_o$ to a very low level.

In one embodiment actually reduced to practice, for an output frequency of 50 Hz and switching frequency of 10 KHz the three-terminal filter 18 (see FIG. 2*a*) consisted of L1, L2, L3, C1, C2 and C3 of the following values: L1 = L2 = L3 = 400μhy and C1 = C2 = C3 = 10μf. It provided a bandwidth of 2 KHz and an attenuation of 60 dB at 10 KHz. Thus, corrections up to the fortieth harmonic of the output frequency was achievable, and the output ripple was held to about 0.1%. A four-terminal filter as shown in FIG. 5 for the same band and roll-off may include components with the following values: L1 = L2 = L3 = L4 = L5 = L6 = 400μhy and C1 = C2 = C3 = 5μf.

It should be pointed out that the switching frequency may be asynchronous with the output frequency, resulting in the ripple moving randomly in relation to the waveform of $E_o$. Different loads have different tolerances to the ripple level. If desired, the switching frequency may be synchornized with the output frequency. In such a case, the ripple appears as a stationary disturbance on the $E_o$ waveform. Such a ripple is often regarded as an output waveform distortion, since it is repeated with each cycle of the output $E_o$. Some loads can tolerate more distortion than unsynchronized ripple. Therefore, for such loads the switching rate can be lowered.

The upper limits of the switching frequency is of course imposed by the devices used in implementing the switches. SCRs, which are presently available, are capable of operating at switching frequencies of up to a few KHz. Commercially available transistors, when connected as hereinbefore described in connection with FIG. 6, can be used at much higher switching frequencies. Present-day relatively inexpensive, yet sufficiently reliable transistors are limited to a switching frequency of not more than 50 KHz.

The types of solid state devices which may be used in implementing the switches clearly depend on the availability and cost of devices, capable of operating at the maximum selected switch rate. With advances being made in the development of solid state devices it is not unlikely that in the future devices other than transistors, capable of switching at a high rate, e.g., 10 KHz and more, may be available at reasonable prices. Thus, the present invention contemplates the use of such solid-state devices, and is not intended to be limited to transistors.

It should be pointed out that very high switch rates lead to less reliable operation, more switch power losses and therefore lower conversion efficiency. In general, in order to achieve at least some of the significant advantages of the invention the switching frequency should be selected so that for the desired output frequency the filter can be designed easily with inexpensive components to provide a desired band pass and sufficient attenuation at the switching frequency to hold the ripple not to exceed a permissible level.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A DC to AC power converter comprising:

a plurality of input terminals adapted to be connected to a source of DC power, one of said terminals being connectable to a reference voltage of said DC power source;

a plurality of switch means including at least first and second switches directly connected to at least some of said input terminals, each switch being switchable between On and Off states;

output means including a pair of converter output terminals to which an AC load is adapted to be connected, and including filter means connected between said switch means and said output terminals; and control means connected to said output terminals and to said switch means for regulating the AC output voltage at said output terminals to be at a preselected output frequency, definable as $f_o$ of a preselected waveshape, and for controlling the switching of each of said power switches between its On and Off states, with a selected switching frequency, definable as $f_s$, where $f_s = nf_o$, $n$ being not less than 10 said control means include means for applying turn-on and turn-off signals to each of said switches, to respectively drive the switch to its On and Off states, respectively, and means for controlling the application of a turn-on signal to one of said switches only after the passage of a preselected time interval following the application of a turn-off signal to the other of said switches.

2. The converter as described in claim 1 wherein each of said switches comprises a plurality of parallel connected solid-state switching devices, and protective means for permanently disrupting the flow of current through any of the switch devices which is in a shorted current conductive state.

3. The converter as described in claim 2 wherein said solid-state devices are transistors with each switch defining first and second common points, means for connecting the emitters of said transistors to said first common point, means for connecting the collectors of said transistor to said second common point and said protective means comprising separate current-limited means connected in series with the collector to emitter path of each transistor between said first and second common points, said current-limited means being characterized by permanently disrupting current flow therethrough when current which flows therethrough exceeds a selected amplitude.

4. The converter as described in claim 3 wherein each switch includes input means, and said control means include means for applying turn-on and turn-off signals to the input means of each switch to drive the switch's transistors to their On and Off states, respectively, said input means including first and second transformers for passing energy at said $f_o$ and $f_s$ respectively, and means for energy wise isolating said transformers from one another.

5. A DC to AC power converter comprising:

first and second input terminals adapted to be connected respectively to first and second terminals of a DC power source, exhibiting a DC voltage, definable as $E_{dc}$, between its terminals;

first, second, third, and fourth power switches each switchable between On and Off states;

means for connecting said first and second switches in series across said first and second input terminals, and for connecting said third and fourth switches in series across said first and second input terminals;

filter means having input terminals and output terminals;

means for connecting first and second junction points, representing the junction points between said first and second switches, and between said third and fourth switches, respectively, to the input terminals of said filter means;

first and second converter output terminals adapted to be connected to an AC load;

means for connecting the output terminals of said filter means to the converter output terminals; and control means coupled to said converter output terminals and to said switches for controlling the AC voltage across said converter output terminals to be of a selected waveshape and at a selected frequency, definable as $f_o$, by controlling the On and Off states of said switches said control means include means for controllably switching said switches at a switching frequency, definable as $f_s$ where $f_s = nf_o$, $n$ being greater than one, by the application of a turn-on signal or a turn-off signal to each switch, to switch the latter to its On state or its Off state respectively, and including means for controlling the application of a turn-on signal to one of said first and second switches only after a selected time interval following the application of a turn-off signal to the other of said first and second switches, and for controlling the application of turn-on signal to one of said third and fourth switches only after a selected time interval following the application of turn-off signal to the other of said third and fourth switches, and each of said switches includes a plurality of parallel connected solid-state devices, each device being switchable between an On state in which it provides a current conductive path, and an Off state in which it substantially inhibits current flow therethrough and said selected time interval is a function of the time required for said devices to return from an On state to an Off state, after the application of a turn-off signal to the switch incorporating said devices.

6. A DC to AC power converter comprising:

first, second, and third input terminals adapted to be connected respectively to first, second and third terminals of a DC power source of a type exhibiting a DC voltage, definable as $+E_{dc}$, at its first terminal with respect to a reference voltage at its third terminal, and a DC voltage, definable as $-E_{dc}$, at its second terminal with respect to said reference voltage;

a first switch, switchable between On and Off states, connected to said first input terminal and to a common junction point;

a second switch, switchable between On and Off states, connected to said second input terminal and to said common junction point;

first and second output terminals adapted to be connected to an AC load;

filter means connected to said common junction point, to said reference voltage and to said converter output terminals; and control means coupled to said output terminals and to said first and second switches for controlling the AC voltage across said output terminals to be of a selected waveshape and at a selected frequency, definable as $f_o$, by controlling the On and Off states of said first and second switches, said control means include means for controllably driving each switch between its On and Off states at a switcing frequency, definable as $f_s$, where $f_s = nf_o$, where $n$ is not less than 10, by the application of turn-on and turn-off signals thereto;

each switch includes a plurality of transistors with the switch defining first and second common points, means for connecting the emitters of said transistors to said first common point, means for connecting the collectors of said transistor to said transistor to said second common point and input means responsive to said turn-on signal or said turn-off signal for applying a turn-on drive signal or a turn-off drive signal, respectively, to the bases of said transistors, each switch further including protective means comprising separate current-limiting means, connected in series with the collector to emitter path of each transistor between said first and second common points, said current limiting means being characterized by permanently disrupting current flow therethrough when current which flows therethrough exceeds a selected amplitude; and the input means of each switch include first and second transformers, responsive to energy at $f_o$ and $f_s$, respectively, and means for isolating said second transformer from energy at $f_o$ and for isolating said first transformer from energy at $f_s$.

7. The converter as described in claim 6 wherein said control means include means for controlling the application of a turn-on signal to one of said switches only after a preselected time interval following the application of a turn-off signal to the other switch.

8. A DC to AC power converter comprising:

a plurality of input terminals adapted to be connected to a source of DC power, one of said terminals being connectable to a reference voltage of said DC power source;

a plurality of switch means including at least first and second switches directly connected to at least some of said input terminals, each switch being switchable between On and Off states;

output means including a pair of converter output terminals to which an AC load is adapted to be connected, and including filter means connected between said switch means and said output terminals; and control means connected to said output terminals and to said switch means for regulating the AC output voltage at said output terminals to be at a preselected output frequency, definable as $f_o$ of a preselected waveshape, and for controlling the switching of each of said power switches between its On and Off states, with a selected switching frequency, definable as $f_s$, where $f_s = nf_o$, n being not less than 10; and each of said switches comprising a plurality of parallel connected transistors with each switch defining first and second common points connecting means for connecting the emitters and collectors of said transistors to said first and second common points, respectively, and further including input means coupled to said control means which include means for applying turn-on and turn-off signals to the input means of each switch to drive the switch's transistors to their On and Off states, respectively, said input means including first and second transformers for passing energy at said $f_o$ and $f_s$ respectively, and means for energy-wise isolating said transformers from one another.

9. The converter as described in claim 8 wherein said control means include means for controlling the application of a turn-on signal to one of said switches only after the passage of a preselected time interval following the application of a turn-off signal to the other of said switches, said preselected time interval being not less than the time required for transistors of the switch, which was previously turned on to return to their nonconductive states.

10. The converter as described in claim 8 wherein substantially each of said transistors has current-limiting means, connected in series with the transistor's collector-emitter path to permanently disrupt the current flow through the transistor after the current exceeded preselected limit.

11. The converter as described in claim 10 wherein said control means includes means for controlling the application of a turn-on signal to one of said switches only after the passage of a preselected time interval following the application of a turn-off signal to the other of said switches, said preselected time interval being not less than the time required for transistors of the switch, which were previously turned on to return to their nonconductive state.

12. A DC to AC power converter comprising:

first, second, and third input terminals adapted to be connected respectively to first, second and third terminals of a DC power source of a type exhibiting a DC voltage, definable as $+E_{dc}$, at its first terminal with respect to a reference voltage at its third terminal, and a DC voltage, definalbe as $-E_{dc}$, at its second terminal with respect to said reference voltage;

a first switch, switchable between On and Off states, connected to said first input terminal and to a common junction point;

a second switch, switchable between On and Off states, connected to said second input terminal and to said common junction point;

first and second output terminals adapted to be connected to an AC load;

filter means connected to said common junction point, to said reference voltage and to said converter output terminals; and control means coupled to said output terminals and to said first and second switches for controlling the AC voltage across said output terminals to be of a selected waveshape and at a selected frequency, definable as $f_o$, by controlling the On and Off states of said first and second switches, said first switch is directly connected between said first input terminal and said common junction point and said second switch is directly connected between said third input terminal and said common junction point, and said control means include means for controllably driving each switch between its On and Off states at a switching frequency, definable as $f_s$, where $f_s = nf_o$, where n is not less than 10, by the application of turn-on and turn-off signals threto; and each of said switches comprises a plurality of parallel conencted solid-state switchable devices, and protective means for permanently disrupting the flow of current through any of the switch devices which is in a shorted current conductive state and said control means include means for controlling the application of a turn-on signal to one of said swithces only after a preselected time interval following the application of a turn-off signal to the other switch.

13. The converter as described in claim 12 wherein each switch includes input means responsive to the turn-on signal or turn-off signal applied by said control means to the switch, the iput means of each switch include first and second transformers responsive to energy at $f_o$ and $f_s$, respectively, and means for isolating said second transformer from energy at $f_0$ and isolating said firt transformer from energy at $f_s$.

14. A DC to AC power converter comprising:

first and second input terminals adapted to be connected respectively to first and second terminals of a DC power source, exhibiting a DC voltage, definable as $E_{dc}$, between its terminals;

first, second, third and fourth power switches each switchable between On and Off states;

means for connecting said first and second swithces in series across said first and second input terminals and for connecting said third and fourth switches in series across said first and second input terminals;

filter means having input terminals and output terminals;

means for connecting first and second junction points, representing the junction points between said first and second swithces, and between said third and fourth switches, respectively, to the input terminals of said filter means;

first and second converter output terminals adapted to be connected to an AC load;

means for connecting the output terminals of said filter means to the converter output terminals; and control means coupled to said converter output terminals and to said switches for controlling the AC voltage across said converter output terminals to be of a selected waveshape and at a selected frequency, definable as $f_0$, by controlling the On and Off states of said switches, said control means include means for controllably driving each switch between its On and Off states at a switching frequency, definable as $f_s$, where $f_s = nf_o$, where $n$ is not less than 10, by the application of turn-on and turn-off signals respectively, thereto, and each switch includes a plurality of transistors with the switch defining first and second common points, means for connecting the emitters of said transistors to said first common point, means for connecting the collectors of said transistor to said second common point, and input means responsive to said turn-on signal or said turn-off signal for applying turn-on drive signals or turn-off drive signals, respectively to the bases of said transistors, each switch further including protective means comprising separate current-limiting means connected in series with the collector to emitter path of each transistor between said first and second common points, said current-limiting means being characterized by permanently disrupting current flow therethrough when current which flows therethrough exceeds a selected amplitude, and the input means of each switch include first and second transformers responsive to energy at $f_o$ and $f_s$, respectively, and means for isolating said second transformer from energy at $f_o$ and for isolating said first transformer from energy at $f_s$.

15. The converter as described in claim 14 wherein said control means include means for applying turn-on and turn-off signals to each of said switches, to respectively drive the switch to its On and Off states respectively, and means for controlling the application of a turn-on signal to one of said switches only after the passage of a preselected time interval following the application of turn-off signal to the other of said switches.

* * * * *